(12) United States Patent
Cretella et al.

(10) Patent No.: US 10,804,644 B2
(45) Date of Patent: Oct. 13, 2020

(54) ELECTRICAL GROUND BOX

(71) Applicant: Hubbell Incorporated, Shelton, CT (US)

(72) Inventors: Joseph Cretella, Ansonia, CT (US); Scott Wurms, Shelton, CT (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 16/595,893

(22) Filed: Oct. 8, 2019

(65) Prior Publication Data
US 2020/0112122 A1 Apr. 9, 2020

Related U.S. Application Data

(60) Provisional application No. 62/742,686, filed on Oct. 8, 2018.

(51) Int. Cl.
*H01R 13/52* (2006.01)
*H02G 3/08* (2006.01)

(52) U.S. Cl.
CPC ..... *H01R 13/5227* (2013.01); *H01R 13/5202* (2013.01); *H02G 3/088* (2013.01)

(58) Field of Classification Search
CPC . H01R 13/5227; H01R 13/5202; H02G 3/088
USPC ........................................................ 439/206
See application file for complete search history.

(56) References Cited

U.S. PATENT DOCUMENTS

| | | | | |
|---|---|---|---|---|
| 3,082,627 | A | * | 3/1963 | Yeo .................... F16K 17/36 74/2 |
| 5,122,069 | A | * | 6/1992 | Brownlie ............ G02B 6/4451 174/53 |
| 5,680,970 | A | | 10/1997 | Smith et al. |
| 6,084,520 | A | | 7/2000 | Salvucci |
| 6,787,698 | B2 | | 9/2004 | Higuchi et al. |
| 8,017,865 | B1 | | 9/2011 | Baldwin |
| 8,530,757 | B2 | * | 9/2013 | Dinh .................... H02G 3/088 174/481 |
| 9,653,897 | B2 | * | 5/2017 | Hemingway ........ H02G 3/081 |
| 9,653,900 | B2 | * | 5/2017 | Hemingway ........ H02G 3/185 |
| 10,283,949 | B2 | * | 5/2019 | Thomas ............... H02G 3/088 |
| 2010/0230128 | A1 | | 9/2010 | Aburaya et al. |
| 2013/0078853 | A1 | * | 3/2013 | Dinh .................... H02G 3/14 439/535 |
| 2014/0083734 | A1 | | 3/2014 | Magno, Jr. et al. |

(Continued)

OTHER PUBLICATIONS

PCT/US2019/055140 International Search Report and Written Opinion dated Jan. 9, 2020 (12 pages).

(Continued)

*Primary Examiner* — Harshad C Patel
(74) *Attorney, Agent, or Firm* — Michael Best & Friedrich, LLP

(57) ABSTRACT

An electrical ground box is configured to support an electrical outlet receptacle, and the electrical outlet receptacle is operable to supply electrical power to a connected electrical device. The electrical ground box includes a base and a valve. The base includes a plurality of walls and an outlet. The valve is moveable between an open position in which fluid is permitted to flow through the outlet and a closed position in which fluid is inhibited from passing through the outlet.

21 Claims, 7 Drawing Sheets

(56) References Cited

U.S. PATENT DOCUMENTS

2016/0156167 A1     6/2016   Mackereth et al.

OTHER PUBLICATIONS

Legrand, North America, YouTube Video, "Wiremold: Outdoor Ground Box Water Demo", <https://www.youtube.com/watch?v=RrNDFmoL2rE> (Sep. 30, 2016).

* cited by examiner

ELECTRICAL GROUND BOX

CROSS-REFERENCE TO RELATED APPLICATIONS

This application claims the benefit of co-pending, prior-filed U.S. Provisional Patent Application No. 62/742,686, filed Oct. 8, 2018, the contents of which are incorporated herein by reference.

TECHNICAL FIELD

The present disclosure relates to an outdoor electrical ground box, and more particularly to a weather resistant outdoor electrical ground box.

SUMMARY

In one independent aspect, an electrical ground box is configured to support an electrical receptacle. The electrical receptacle is operable to supply electrical power to a connected electrical device. The electrical ground box includes a housing, a base, a lid, and a valve. The housing includes a plurality of walls, an upper opening, and a lower opening. At least one of the plurality of walls is configured to support the electrical outlet receptacle within the housing. The upper opening is configured to allow access to the electrical outlet receptacle. The lid selectively covers the upper opening of the housing. At least one of the lid and the housing includes a lock operable to secure the lid to the housing. The base is positioned adjacent the lower opening of the housing and in fluid communication with the lower opening. The base includes an outlet. The valve is movable between an open position in which fluid is permitted to pass through the outlet and a closed position in which fluid is inhibited from passing through the outlet.

In another independent aspect, an electrical ground box is configured to support an electrical outlet receptacle. The electrical outlet receptacle is operable to supply electrical power to a connected electrical device. The electrical ground box includes a housing, a base, and a valve. The housing includes a plurality of walls, an upper opening, and a lower opening. At least one of the plurality of walls is configured to support the electrical outlet receptacle within the housing. The upper opening is configured to allow access to the electrical outlet receptacle. The base is positioned adjacent the lower opening of the housing and in fluid communication with the lower opening. The base includes an outlet. The valve is moveable between an open position in which fluid is permitted to flow through the outlet and a closed position in which fluid is inhibited from passing through the outlet.

In yet another independent aspect, an electrical ground box is configured to support an electrical outlet receptacle, and the electrical outlet receptacle is operable to supply electrical power to a connected electrical device. The electrical ground box includes a base and a valve. The base includes a plurality of walls and an outlet, and the base also includes a sloping surface configured to direct fluid toward the outlet. The valve is moveable between an open position in which fluid is permitted to flow through the outlet and a closed position in which fluid is inhibited from passing through the outlet.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
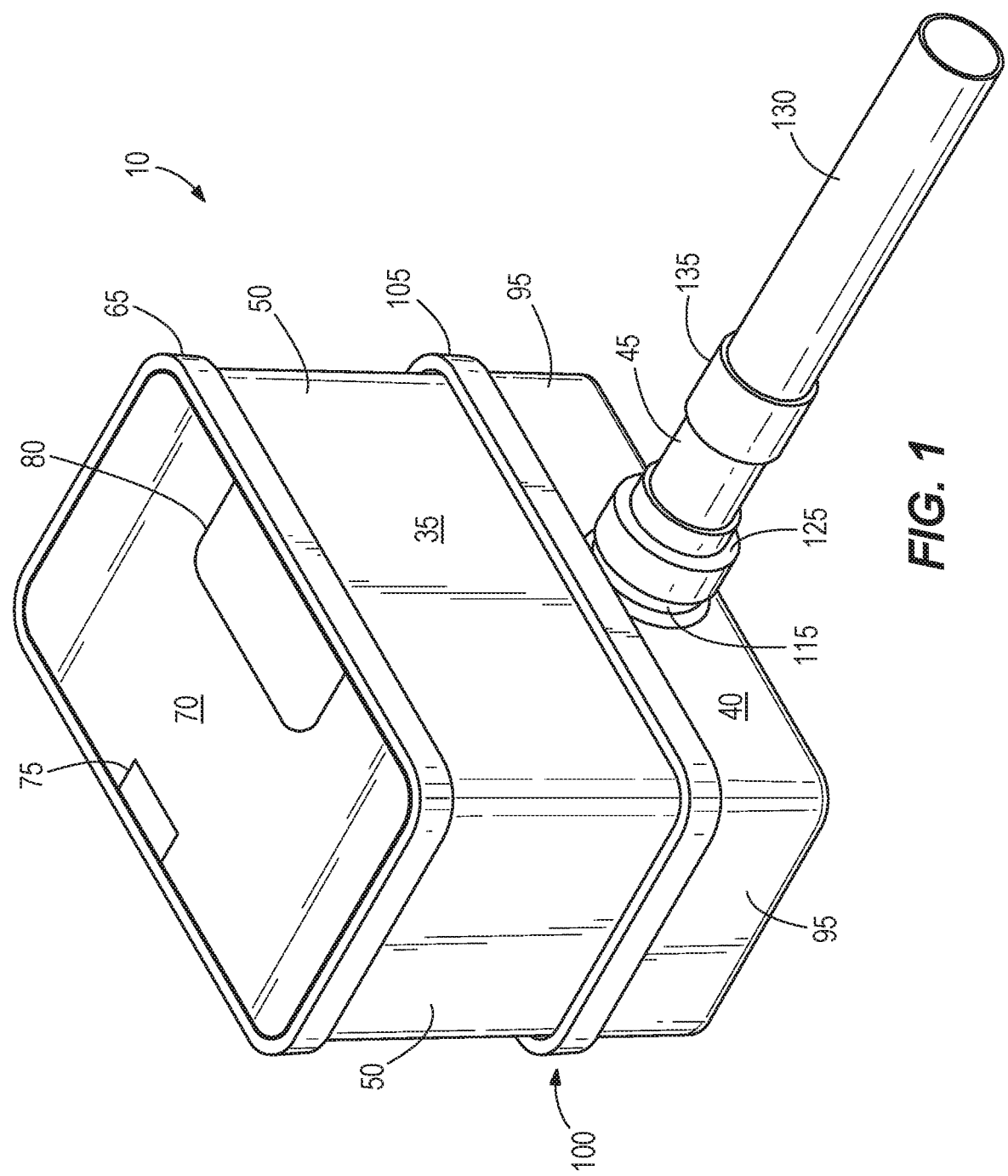
FIG. 1 is a perspective view of a weather resistant electrical ground box.
Figure 2:
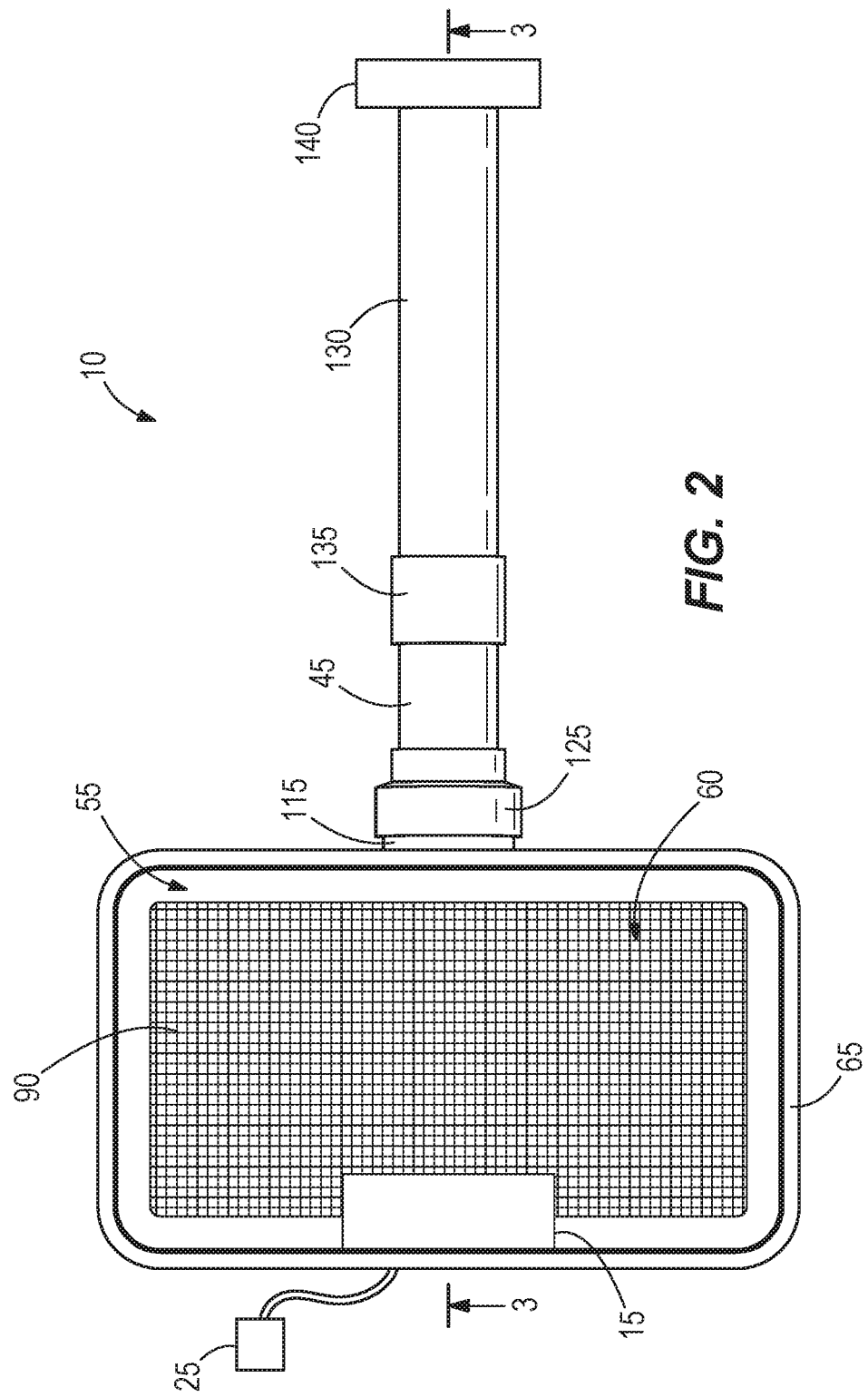
FIG. 2 is a plan view of the electrical ground box of FIG. 1 with a lid removed.
Figure 3:
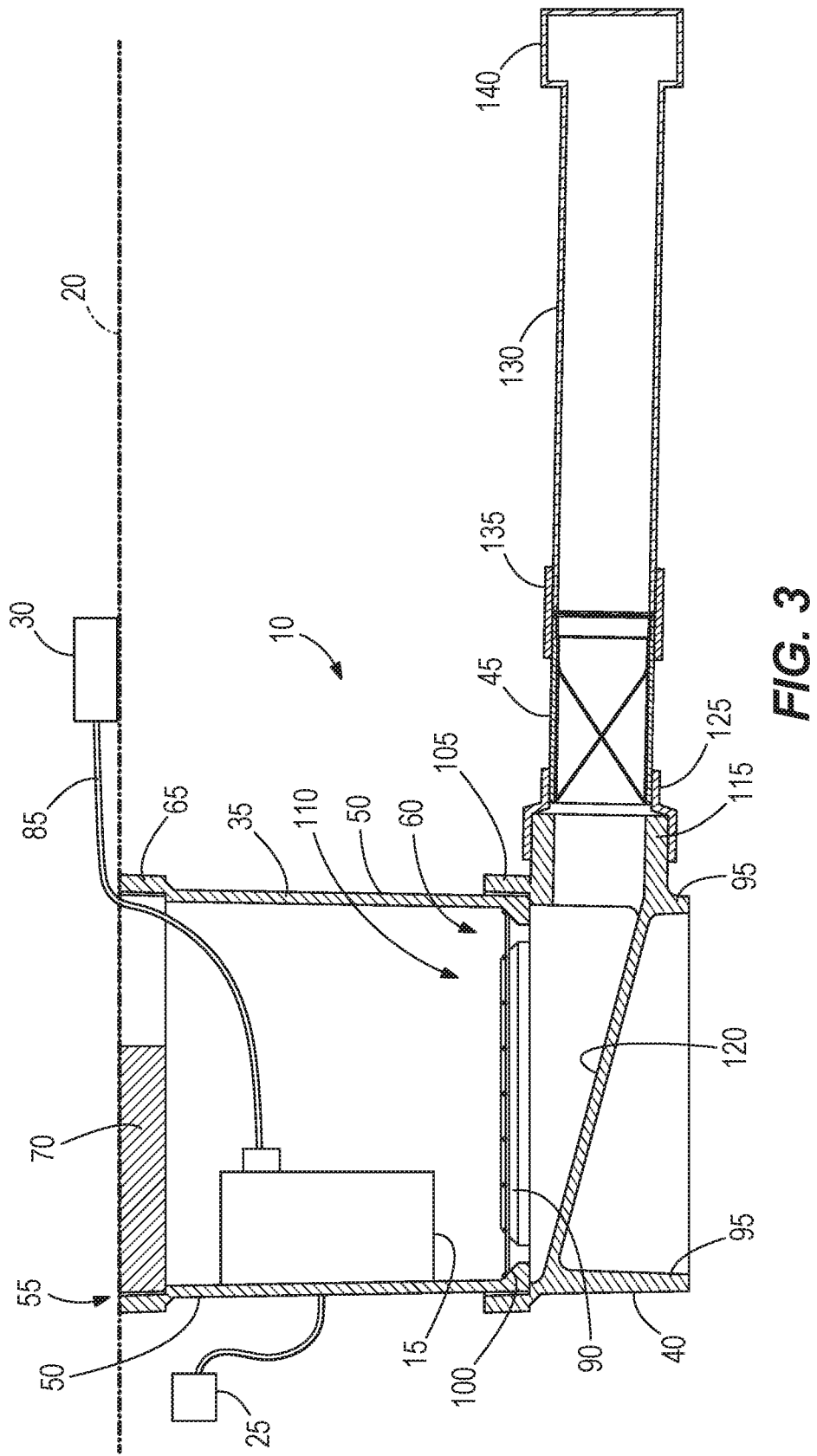
FIG. 3 is a cross sectional view of the electrical ground box of FIG. 2 viewed along section 3-3.

FIGS. 1-3 illustrate a weather resistant electrical ground box 10 for supporting and protecting an electrical outlet receptacle 15 below a surface 20 (i.e., ground—FIG. 3). The electrical outlet receptacle 15 receives electrical power from a power source 25 to supply the electrical power to a corded electrical device 30, which can be supported outside the box 10 while in electrical communication with the receptacle 15. In other embodiments, the outlet receptacle 15 can provide telecommunication data, etc. to the corded device 30. The electrical ground box 10 can be an exterior/outdoor electrical ground box or the electrical ground box 10 can be an interior/indoor electrical ground box.

The illustrated ground box 10 includes a housing 35, a base 40 coupled to the housing 35, and a valve assembly 45 coupled to the base 40. The illustrated housing 35 includes a plurality of vertical walls 50 (e.g., four vertical walls) between an upper opening 55 and a lower opening 60 of the housing 35. In particular, an upper end of the housing 35 includes a housing flange 65 that selectively receives a removable lid 70 of the ground box 10. The lid 70 selectively covers the upper opening 55 of the housing 35 to be generally coextensive or flush with the surface 20 (FIG. 3). In some embodiments, the lid is configured to support foot traffic/vehicle traffic over the ground box 10. The lid 70 includes a lock 75 (FIG. 1) that selectively engages the housing 35 to secure the lid 70 to the housing 35. In other embodiments, the housing 35 can include the lock 75 that selectively engages the lid 70 to secure the lid 70 to the housing 35. The illustrated lid 70 also includes an access aperture 80 sized to receive an electrical cord 85 of the corded electrical device 30. In some embodiments, a cover is selectively positioned over the access aperture 80 of the lid 70 to block or allow access into the housing 35 when the lid 70 is seated with the housing flange 65. As best shown in FIGS. 2 and 3, a grate plate 90 is positioned adjacent a lower end 100 of the housing 35 to cover the lower opening 60. The grate plate 90 is operable to block larger objects (e.g., rocks, etc.) from entering the base 40, which could potentially interfere with the valve assembly 45.

The illustrated base 40 includes a plurality of vertical walls 95 (e.g., four vertical walls), each corresponding to one of the vertical walls 50 of the housing 35 when the base 40 is coupled to a bottom 100 of the housing 35. In particular, the base 40 includes a base flange 105 forming an upper opening 110 of the base 40 and is sized to selectively receive the lower end 100 of the housing 35. In other embodiments, the housing 35 and the base 40 can be formed as a single component. The illustrated base 40 also includes an outlet aperture 115 formed on one of the vertical walls 95 and a sloping interior surface 120 that is inclined downwardly away from the upper opening 110 of the base 40 toward the outlet 115 (FIG. 3). In other words, the sloping surface 120 is obliquely angled relative to the surface 20 and the lid 70 when the lid 70 is coupled to the housing 35. In the illustrated embodiment, the interior surface 120 is a single planar surface extending between all four sides of the base 40. In some embodiments, the sloping surface 120 can include one or more planar surfaces, and/or one or more curved surfaces, etc. In further embodiments, the outlet aperture 115 can be formed on the interior surface 120 (e.g., the outlet aperture 115 can be formed on a bottom surface of the base 40).

Figure 4:
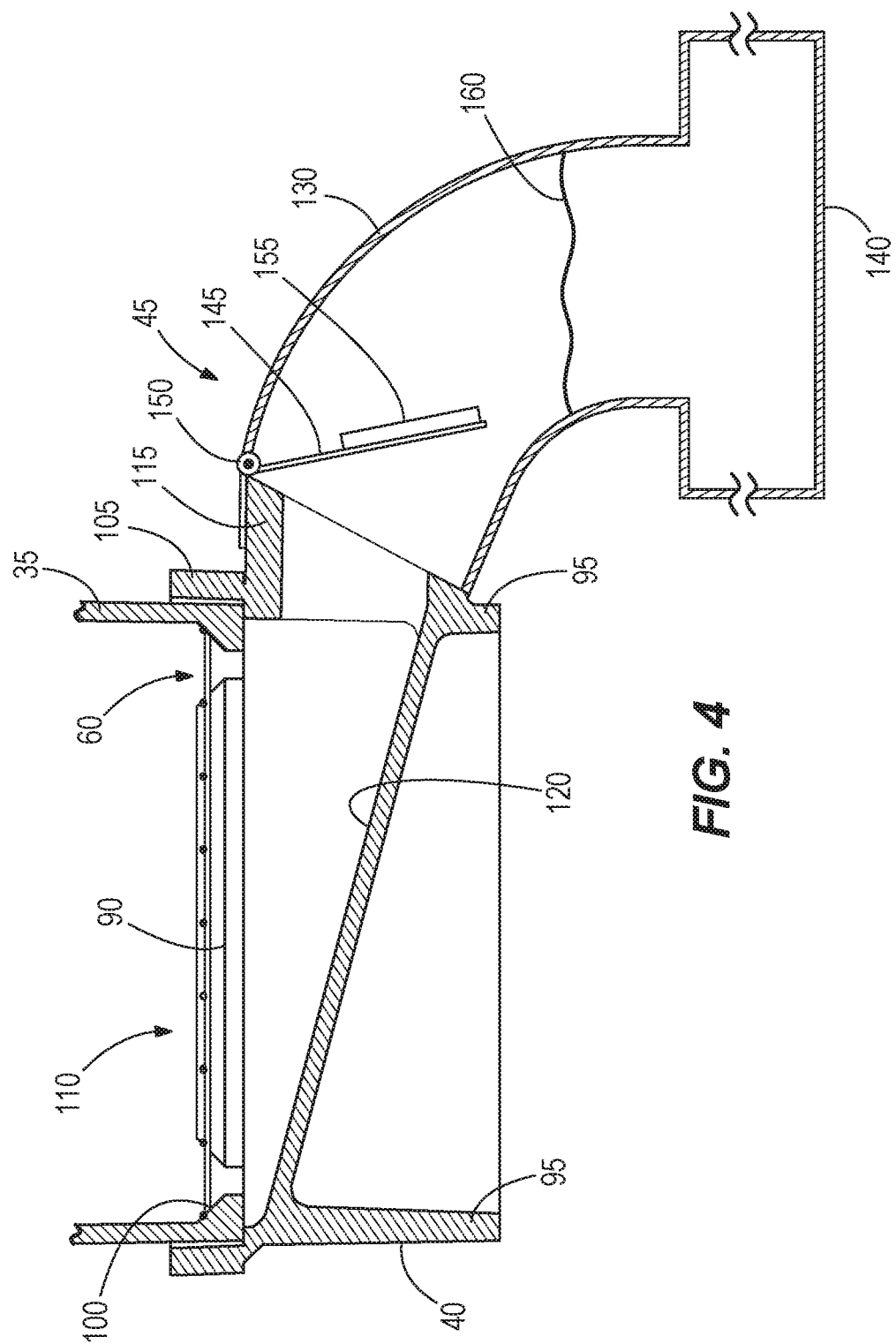
FIG. 4 is a partial view of the electrical ground box of FIG. 3 including a valve assembly in an open position.

With reference to FIG. 3, the illustrated valve assembly 45 is coupled to the outlet 115 by a flexible coupling 125 and is also coupled to a conduit 130 by another flexible coupling 135. In turn, the conduit 130 is coupled to a drainage system 140 (e.g., rock drain, drain tile, etc.). The illustrated valve assembly 45 is a check valve assembly operable to inhibit fluid (e.g., water) from entering the base 40—and ultimately the housing 35—through outlet 115 but allows fluid to escape from the base 40 through the outlet 115. In one embodiment, the valve assembly 45 can be a ballcock valve, a float valve, or the like. For example and with reference to FIGS. 4 and 5, one embodiment of the valve assembly 45 can include a sealing member or plate 145 pivotably coupled to the outlet 115 about a pivot axis 150. The sealing plate 145 also includes a buoyant member 155 (e.g., foam, etc.). Simply under the force of gravity, the sealing plate 145 moves to an open position (FIG. 4), which provides fluid communication between the base 40 and the conduit 130. In other words, the sealing plate 145 is naturally biased into the open position. In other embodiments, the sealing plate 145 can be biased into the open position by, for example, a spring. The illustrated sealing plate 145 is also moveable into a closed position (FIG. 5) to seal with the outlet 115, which blocks fluid communication between the base 40 and the conduit 130.

The illustrated electrical ground box 10 is operable to protect the electrical outlet receptacle 15 from various weather conditions. For example, rainwater can enter into the housing 35 through the access aperture 80 when the corded electrical device 30 is connected to the electrical outlet receptacle 15. Accordingly, the electrical ground box 10 directs the water away from the electrical outlet receptacle 15 toward the drainage system 140 so that the water does not interfere with the electrical outlet receptacle 15. In particular, the water falls through the housing 35 and into the base 40 through the grate plate 90. The water then slides down the sloping surface 120 of the base 40 toward the outlet 115. When the valve assembly 45 is in the open position (FIG. 4), the water travels through the valve assembly 45 and the conduit 130 to be dispensed into the drainage system 140.

Figure 5:
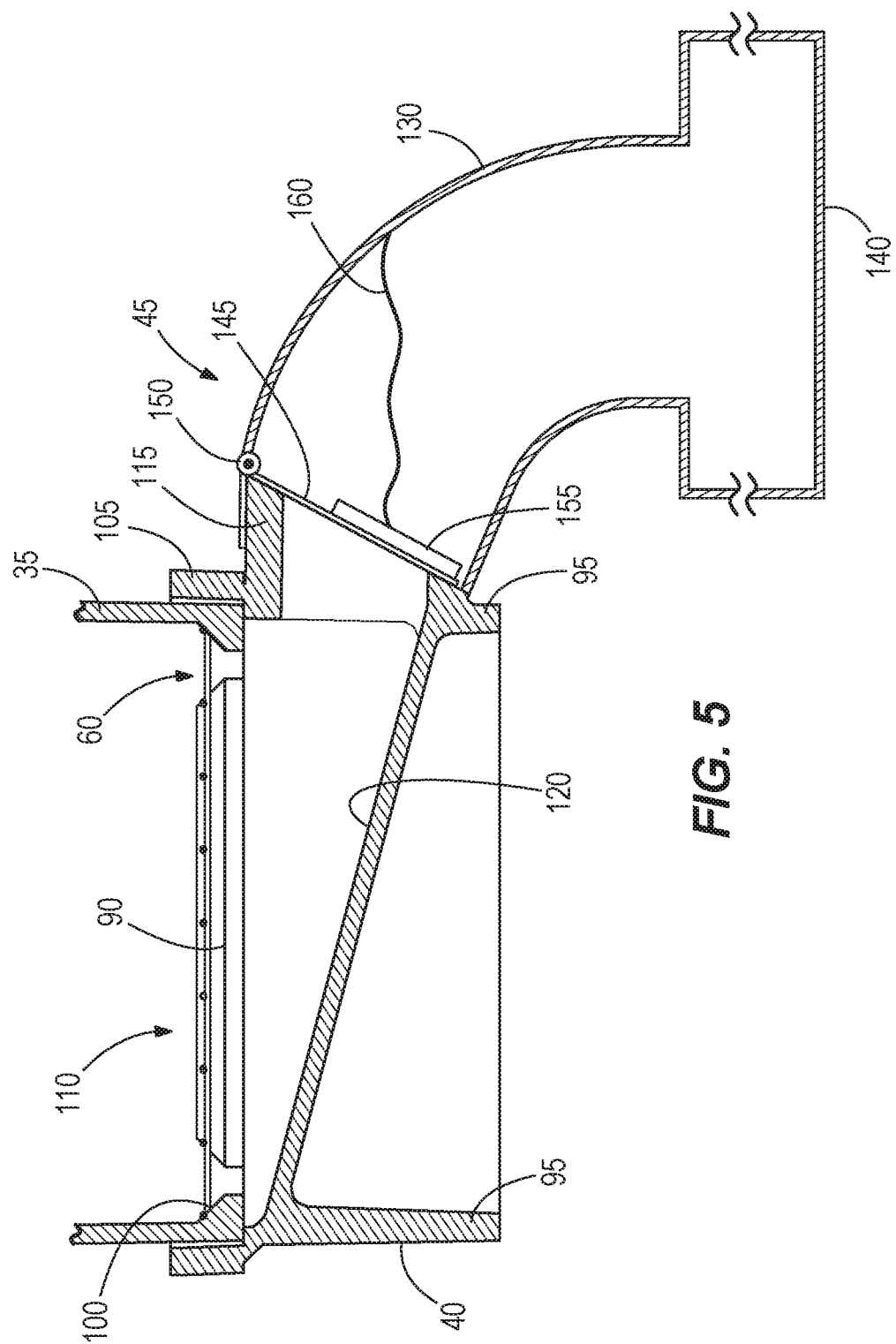
FIG. 5 is a partial view of the electrical ground box of FIG. 3 including the valve assembly in a closed position.

In severe weather conditions (e.g., a flooding or backup condition), the drainage system 140 can become oversaturated with water. As a result, water can back up into the conduit 130 such that the water comes into contact with the buoyant member 155 of the valve assembly 45 (FIG. 5). As a water level 160 continues to rise within the conduit 130, the buoyant member 155 floats on an upper surface of the water and the sealing member 145 is pushed into contact with the outlet 115. In other words, the valve assembly 45 selectively closes the outlet 115 in response to the water level 160 downstream of the outlet 115 rising above a predetermined level within the conduit 130. In some embodiments, the valve assembly 45 can include a stop (not shown) that limits a position of the sealing plate 145 when in the open position (e.g., inhibits the sealing plate 145 from moving perpendicular to the surface 20) to ensure that when the water contacts the buoyant member 155, the sealing plate 145 moves toward the outlet 115 and not away from the outlet 115. Once the sealing plate 145 contacts the outlet 115, the water is blocked from entering the base 40—and ultimately the housing 35—where the water could interfere and damage the electrical outlet receptacle 15.

In some embodiments, the electrical ground box 10 can be anchored below the surface 20 such that the water pushing on the valve assembly 45 (when in the closed position) does not push the housing 35 above the surface 20. For example, the electrical ground box 10 can be anchored by concrete at least partially surrounding the electrical ground box 10.

In conventional ground boxes, applications that require high electrical current (e.g., outdoor events) would require large distribution load centers to be installed above ground and would require electrical cables to be laid on the ground to distribute electrical power. Protective elements on the cables could create trip hazards and speed bumps, and in some cases the high voltage power could be accessed by non-authorized personnel. With the disclosed weather-resistant ground box, on the other hand, electrical power can be distributed in a safe manner, easily controlled, and provide limited access to non-authorized personnel.

Figure 6:
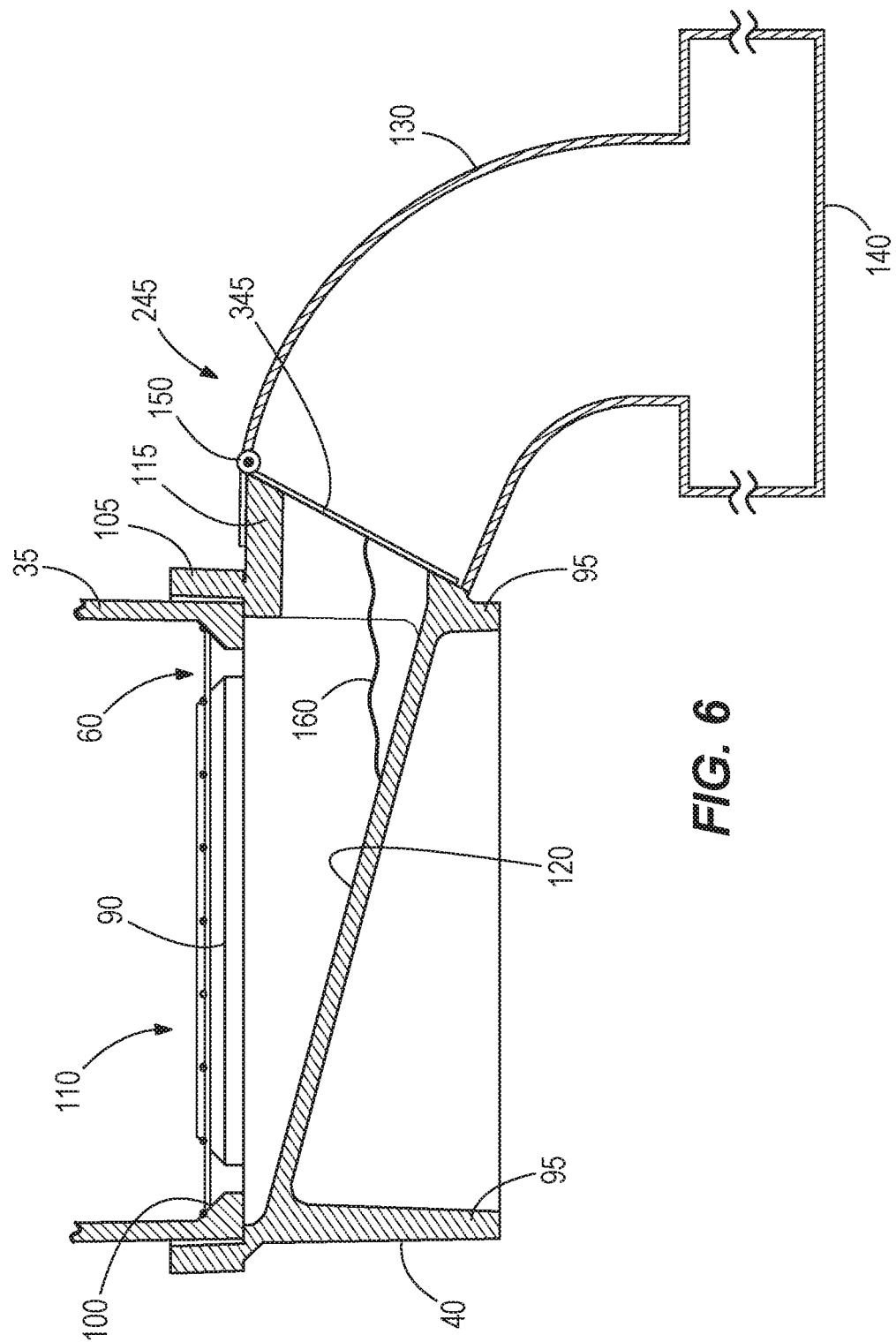
FIG. 6 is a partial view of the electrical ground box of FIG. 3 including a valve assembly according to another embodiment in a closed position.
Figure 7:
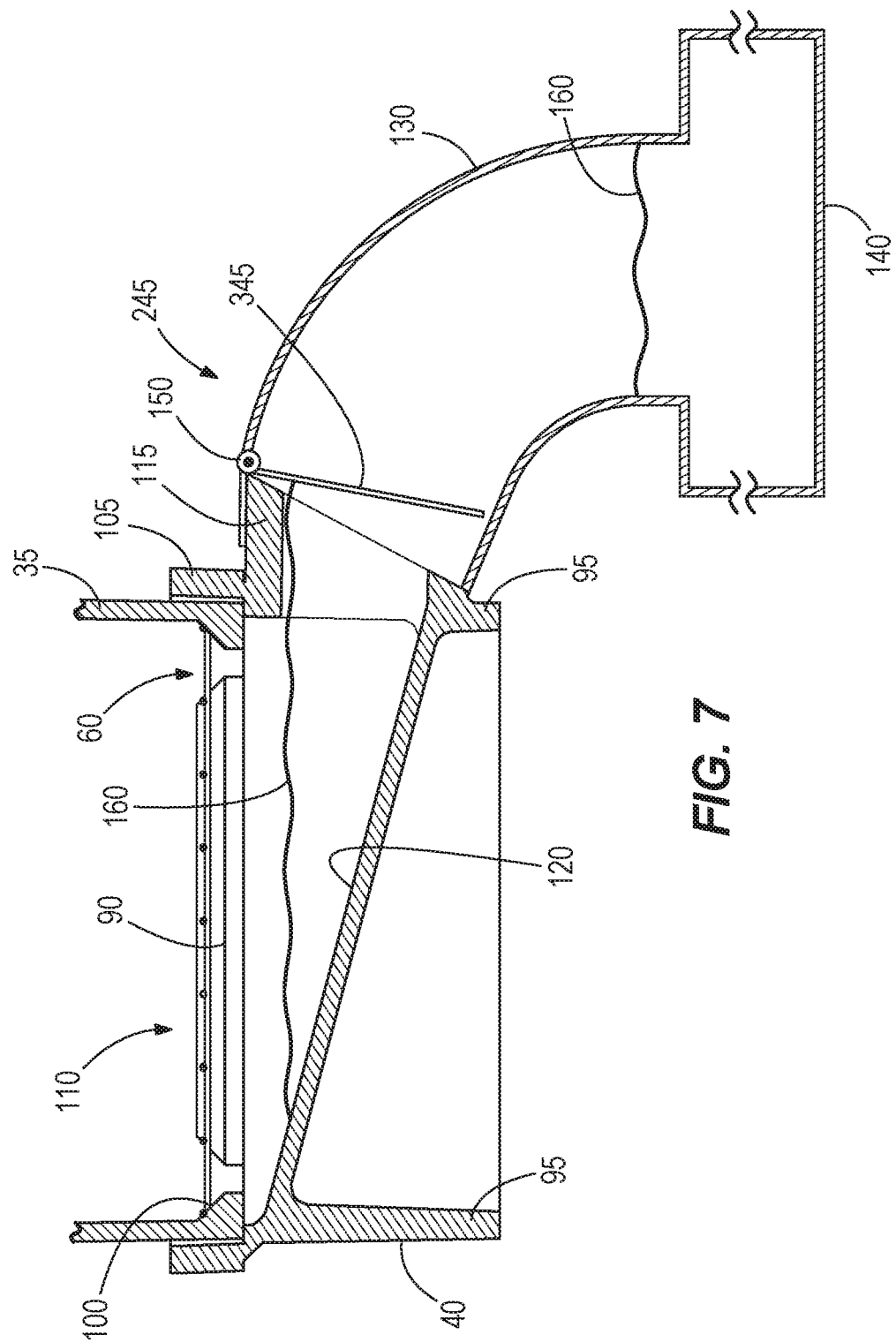
FIG. 7 is a partial view of the electrical ground box of FIG. 3 including the valve assembly of FIG. 6 in an open position.

FIGS. 6 and 7 illustrate a valve assembly 245 according to another embodiment. The valve assembly 245 is similar to the valve assembly 45, and similar components are designated with similar references numbers, incremented by 200. At least some differences and/or at least some similarities between the valve assemblies 45, 245 will be discussed in detail below. In addition, components or features described with respect to the valve assembly 245 could be equally applicable to the valve assembly 45.

The valve assembly 245 is biased toward a closed position (FIG. 6) to inhibit water within the base 40 from entering the drainage system 140 through the valve assembly 245. For example, a biasing member (e.g., a spring) can push a sealing plate 345 of the valve assembly 245 into contact with the outlet 115.

As the water enters the housing 35, the water collects within the base 40 and the water level 160 begins to rise within the base 40 (FIG. 6). The water level 160 continues to rise within the base 40 until reaching a predetermined level in which the pressure acting on the sealing plate 345 by the water causes the valve assembly 245 to move toward an open position (FIG. 7), for example, by overcoming the biasing force, thereby allowing the water to exit the base 40 and enter the drainage system 140. In other words, the valve assembly 245 selectively opens the outlet 115 in response to the water level 160 upstream of the outlet 115 reaching a predetermined level within the base 40. In the illustrated embodiment, the predetermined level of the water level 160 is below the grate plate 90 such that the water does not enter the housing 35.

Once the water level 160 within the base 40 drops below the predetermined level, the pressure on the sealing member 345 decreases and the valve assembly 245 moves back into the closed position (FIG. 6). While the valve assembly 245 is in the closed position, odors from the drainage system 140 are inhibited from passing into the housing 35, and animals, insects, etc. are blocked from entering the housing 35 through the valve assembly 245.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An electrical ground box configured to support an electrical receptacle, the electrical receptacle operable to supply electrical power to a connected electrical device, the electrical ground box comprising:
 a housing including a plurality of walls, an upper opening, and a lower opening, at least one of the plurality of walls configured to support the electrical outlet receptacle within the housing, the upper opening configured to allow access to the electrical outlet receptacle;
 a lid selectively covering the upper opening of the housing, at least one of the lid and the housing including a lock operable to secure the lid to the housing;
 a base positioned adjacent the lower opening of the housing and in fluid communication with the lower opening, the base including an outlet; and
 a valve movable between an open position in which fluid is permitted to pass through the outlet and a closed position in which fluid is inhibited from passing through the outlet.

2. The electrical ground box of claim 1, wherein the housing is removably coupled to the base.

3. The electrical ground box of claim 1, wherein the base includes a sloping surface positioned below the lower opening of the housing, and wherein the sloping surface is inclined downwardly from the lower opening toward the outlet to direct fluid toward the outlet.

4. The electrical ground box of claim 1, further comprising a grate plate positioned adjacent a lower end of the housing, wherein the grate plate is configured to allow fluid to enter the base from the housing and inhibit debris from entering the base from the housing.

5. The electrical ground box of claim 1, wherein the lid includes an access opening, and wherein the access opening is configured to receive an electrical cable of the electrical device to be coupled to the electrical outlet receptacle within the housing when the lid is coupled to the housing.

6. The electrical ground box of claim 1, wherein the valve includes a sealing plate and a buoyant member, wherein the buoyant member is configured to move the valve toward the closed position in response to a fluid level increasing downstream of the valve.

7. The electrical ground box of claim 6, wherein the valve is naturally biased toward the open position.

8. The electrical ground box of claim 1, wherein the valve is biased toward the closed position and the valve opens in response to a volume of water in the base rising above a predetermined level.

9. An electrical ground box configured to support an electrical outlet receptacle, the electrical outlet receptacle operable to supply electrical power to a connected electrical device, the electrical ground box comprising:
 a housing including a plurality of walls, an upper opening, and a lower opening, at least one of the plurality of walls configured to support the electrical outlet receptacle within the housing, the upper opening configured to allow access to the electrical outlet receptacle;
 a base positioned adjacent the lower opening of the housing and in fluid communication with the lower opening, the base including an outlet; and
 a valve moveable between an open position in which fluid is permitted to flow through the outlet and a closed position in which fluid is inhibited from passing through the outlet.

10. The electrical ground box of claim 9, wherein the housing is removably coupled to the base.

11. The electrical ground box of claim 9, wherein the base includes a sloping surface positioned below the lower opening of the housing, and wherein the sloping surface is inclined downwardly from the lower opening toward the outlet to direct fluid toward the outlet.

12. The electrical ground box of claim 9, further comprising a grate plate positioned adjacent a lower end of the housing, wherein the grate plate is configured to allow fluid to enter the base from the housing and inhibit debris from entering the base from the housing.

13. The electrical ground box of claim 9, further comprising a lid selectively covering the upper opening of the housing, wherein at least one of the lid and the housing includes a lock for securing the lid to the housing.

14. The electrical ground box of claim 13, wherein the lid includes an access opening, and wherein the access opening is configured to receive an electrical cable of the electrical device to be coupled to the electrical outlet receptacle within the housing when the lid is coupled to the housing.

15. The electrical ground box of claim 9, wherein the valve selectively closes the outlet in response to a water level downstream of the outlet rising above a predetermined level.

16. The electrical ground box of claim 15, wherein the valve is naturally biased toward the open position.

17. An electrical ground box configured to support an electrical outlet receptacle, the electrical outlet receptacle operable to supply electrical power to a connected electrical device, the electrical ground box comprising:
 a base including a plurality of walls and an outlet, the base also including a sloping surface configured to direct fluid toward the outlet; and
 a valve moveable between an open position in which fluid is permitted to flow through the outlet and a closed position in which fluid is inhibited from passing through the outlet.

18. The electrical ground box of claim 17, further comprising a housing including a plurality of walls and configured to support the electrical outlet receptacle, wherein the housing also includes an upper opening configured to allow access to the electrical outlet receptacle.

19. The electrical ground box of claim 17, wherein the valve includes a sealing plate pivotably coupled to the outlet and a buoyant member, and wherein the buoyant member is configured to move the valve into the closed position in response to a water level increasing downstream of the valve.

20. The electrical ground box of claim 17, wherein the valve is naturally biased toward the open position.

21. The electrical ground box of claim 17, wherein the valve is biased toward the closed position.

\* \* \* \* \*